(12) United States Patent
Ryan

(10) Patent No.: US 6,476,996 B1
(45) Date of Patent: Nov. 5, 2002

(54) DISK DRIVE COMPRISING AN ACTUATOR DRIVER CIRCUIT FOR RETRACTING A HEAD INDEPENDENT OF A SERVO MICROPROCESSOR WHEN A SPINDLE SPEED FAULT MODE IS DETECTED

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/505,009

(22) Filed: Feb. 15, 2000

(51) Int. Cl.[7] ............................. G11B 21/12; G11B 5/54
(52) U.S. Cl. ...................... 360/75; 318/459; 360/73.03
(58) Field of Search ................. 360/73.03, 75, 360/69, 71, 74.1; 318/459, 461, 463, 464

(56) References Cited

U.S. PATENT DOCUMENTS

| | | | |
|---|---|---|---|
| 4,371,903 A | * 2/1983 | Lewis | ........................ 360/75 |
| 4,866,554 A | 9/1989 | Stupeck et al. | |
| 5,073,853 A | 12/1991 | Johnson | |
| 5,313,445 A | * 5/1994 | Wada et al. | ............... 360/75 X |
| 5,495,156 A | 2/1996 | Wilson et al. | |
| 5,872,434 A | 2/1999 | Hill | |
| 5,872,670 A | 2/1999 | Ataee | |
| 5,889,629 A | 3/1999 | Patton, III | |
| 6,005,359 A | * 12/1999 | Brambilla et al. | ...... 318/459 X |
| 6,101,062 A | * 8/2000 | Jen et al. | ........................ 360/75 |
| 6,141,173 A | * 10/2000 | Kitazaki et al. | ............... 360/75 |
| 6,177,772 B1 | * 1/2001 | Barua et al. | ................. 318/362 |

* cited by examiner

Primary Examiner—David Hudspeth
Assistant Examiner—James L Habermehl
(74) Attorney, Agent, or Firm—Milad G Shara, Esq.

(57) ABSTRACT

A disk drive comprising a disk having a data area, a head, a spindle motor for spinning the disk, and an actuator for positioning the head over the data area during a spindle speed control mode, and retracting the head away from the data area during a spindle speed fault mode is disclosed. A servo microprocessor executes steps of a servo control program to generate a first control signal. An actuator driver circuit is responsive to the first control signal for controlling the actuator during the spindle speed control mode. A spindle speed detector generates a spindle speed signal representing a spin rate of the spindle motor, and a spindle speed fault detector is responsive to the spindle speed signal for detecting the spindle speed fault mode and generating a second control signal in response to the detected spindle speed fault mode. The actuator driver circuit is responsive to the second control signal so that the actuator retracts the head away from the data area independent of the servo microprocessor during the spindle speed fault mode.

11 Claims, 6 Drawing Sheets under normal operating parameters and at a rate of speed sufficient for the air bearing to form, thus enabling the head to "fly" over the disk without contacting it.

DISK DRIVE COMPRISING AN ACTUATOR DRIVER CIRCUIT FOR RETRACTING A HEAD INDEPENDENT OF A SERVO MICROPROCESSOR WHEN A SPINDLE SPEED FAULT MODE IS DETECTED

BACKGROUND OF THE INVENTION

1. Field of the Invention

The present invention relates to spindle motors for disk drives. More particularly, the present invention relates to a disk drive comprising a spindle speed fault detector for retracting a head independent of a servo microprocessor when a spindle speed fault mode is detected.

2. Description of the Prior Art

Magnetic disk drives employ a head which is actuated over the surface of a spinning disk for writing and reading data to and from concentric data tracks. As the disk spins, a thin layer air-bearing forms between the head and the disk such that the head is said to "fly" just above the surface of the disk. A voice coil motor (VCM) actuates the head over the disk and a spindle motor, typically implemented as a brushless DC motor, controls the rotation of the disk about a spindle. A power driver chip comprises a VCM driver which drives the VCM motor and a spindle driver which drives the spindle motor. A servo microprocessor executes the steps of a servo control program to control the VCM and spindle drivers, thereby controlling the position of the head and angular velocity of the disk.

When the disk spins down such that the thin layer air-bearing dissipates, it is important to retract the head to prevent it from contacting into the surface of the disk and corrupting the recorded data. The disk may spin down for various reasons, for example, when put into an idle mode, when power is shut off or fails, or when the servo microprocessor malfunctions and is no longer servicing the spindle motor driver. If the power is shut off expectedly or the disk drive is put into an idle mode, the servo microprocessor will execute a controlled head park procedure wherein the head is retracted from the data area of the disk and parked in a safe location (e.g., in a landing zone on the disk or on a ramp). A disk controller may also monitor the speed of the spindle motor and issue a command to the servo microprocessor to park the head in the safe location if the spindle speed drops below a predetermined threshold. This might occur, for example, if there is a problem with the mechanics of the spindle motor or with the circuitry in the spindle motor driver.

In exigent situations where the head must be parked independent of the servo microprocessor (e.g., when the power fails or is shut off unexpectedly, or when a watchdog timer detects that the servo microprocessor has malfunctioned), a park circuit within the VCM driver has been employed to automatically park the head. For example, a special power failure circuit has been employed to monitor the power in a disk drive and park the head using the park circuit if the power fails. Similarly, a watchdog timer has been employed to detect when the servo microprocessor has malfunctioned (e.g., when it has entered an infinite loop). The watchdog timer must be serviced periodically by the servo microprocessor, otherwise the head is automatically parked and the servo microprocessor is reset.

Although the aforementioned prior art techniques are adept at detecting certain anomalous situations, such as power failure or certain servo microprocessor failures, there are other situations which can still cause the head to contact the disk. For example, the microprocessor can malfunction with respect to the spindle motor driver and/or a park command issued by a disk controller, but not malfunction with respect to the watchdog timer. When this happens, the watchdog timer will not park the head even though the spindle motor may be losing speed due to the servo microprocessor not servicing the spindle motor driver. Other possible scenarios include the watchdog timer failing, or the watchdog timer being disabled during development so that the servo microprocessor is not automatically reset when a malfunction occurs. The watchdog timer may be disabled during development in order to preserve the state information of the servo microprocessor which can provide valuable insight into the cause of a servo microprocessor malfunction. Yet another situation unaccounted for by the prior art is when a single clock (e.g., a crystal) is used to drive both the servo microprocessor and the watchdog timer. If this clock fails and the spindle motor loses speed, neither the servo microprocessor nor the watchdog timer can issue a command to park the head.

There is, therefore, the need to improve upon the prior art techniques for parking the head independent from the servo microprocessor in exigent situations, including when the servo microprocessor malfunctions in a manner undetectable by a watchdog timer, when the watchdog timer has been disabled or malfunctions, or when the servo microprocessor clock fails.

SUMMARY OF THE INVENTION

The present invention may be regarded as a disk drive comprising a disk having a data area, a head, a spindle motor for spinning the disk, and an actuator for positioning the head over the data area during a spindle speed control mode, and retracting the head away from the data area during a spindle speed fault mode. A servo microprocessor executes steps of a servo control program to generate a first control signal. An actuator driver circuit is responsive to the first control signal for controlling the actuator during the spindle speed control mode. A spindle speed detector generates a spindle speed signal representing a spin rate of the spindle motor, and a spindle speed fault detector is responsive to the spindle speed signal for detecting the spindle speed fault mode and generating a second control signal in response to the detected spindle speed fault mode. The actuator driver circuit is responsive to the second control signal so that the actuator retracts the head away from the data area independent of the servo microprocessor during the spindle speed fault mode.

The present invention may also be regarded as a method of detecting a spindle speed fault mode in a disk drive and, in response to detecting the spindle speed fault mode, retracting a head away from a data area of a disk independent of a servo microprocessor for controlling a spindle motor within the disk drive, the spindle motor for spinning the disk. The method comprises the steps of generating a spindle speed signal representing a spin rate of the spindle motor, processing the spindle speed signal to detect a spindle speed fault mode, and in response to detecting the spindle speed fault mode, retracting the head away from the data area independent of the servo microprocessor.

DESCRIPTION OF THE PREFERRED EMBODIMENTS

Figure 1:
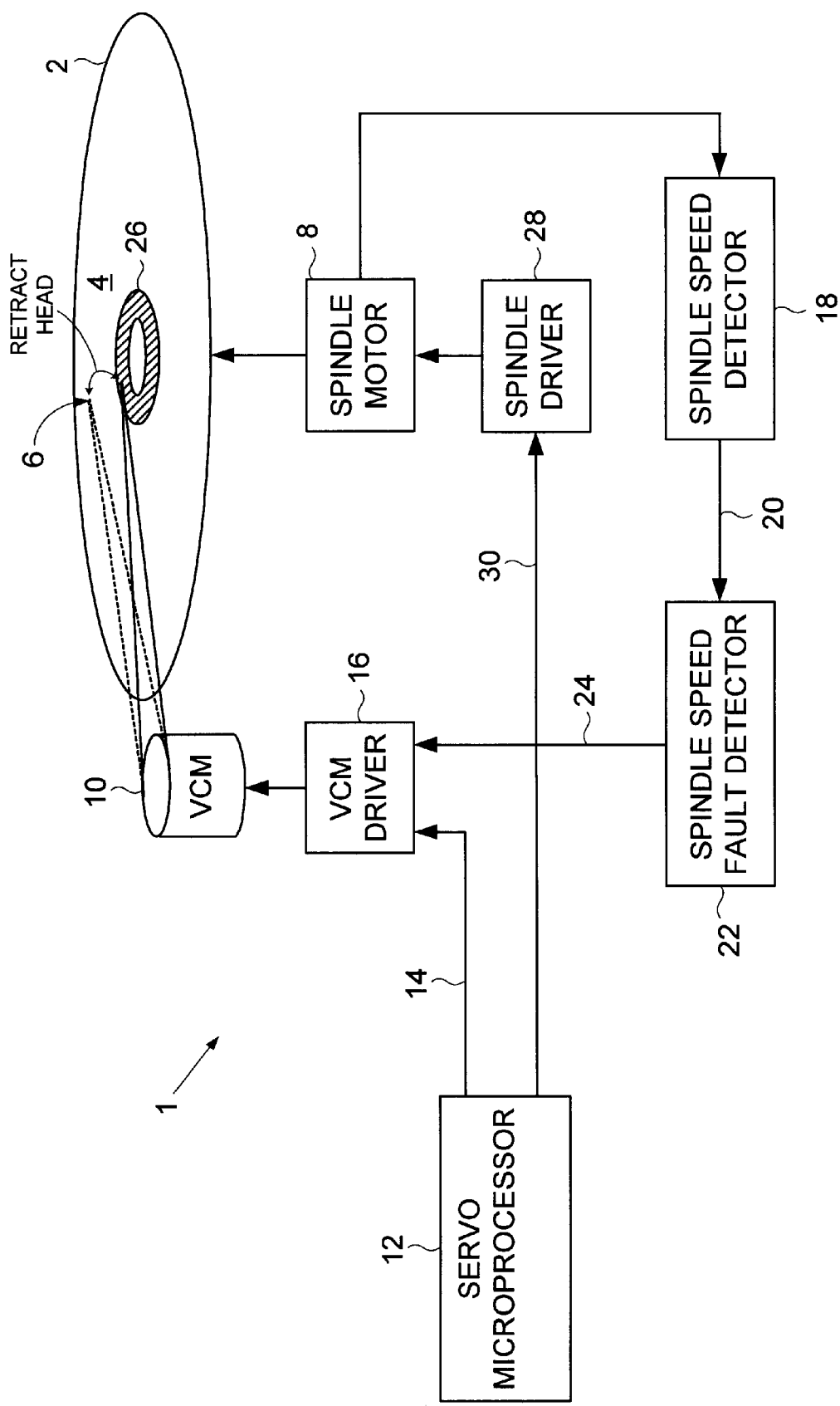
FIG. 1 shows a disk drive according to an embodiment of the present invention comprising a spindle speed fault detector for detecting a spindle speed fault mode and generating a control signal for retracting the head away from a data area of a disk independent of a microprocessor for controlling the spindle motor during normal operations.

FIG. 1 shows a disk drive 1 according to an embodiment of the present invention comprising a disk 2 having a data area 4, a head 6, a spindle motor 8 for spinning the disk 2, and an actuator 10 (e.g., a voice coil motor VCM) for positioning the head 6 over the data area 4 during a spindle speed control mode, and retracting the head 6 away from the data area 4 during a spindle speed fault mode. A servo microprocessor 12 executes steps of a servo control program to generate a first control signal 14. An actuator driver circuit 16 (e.g., VCM driver) is responsive to the first control signal 14 for controlling the actuator 10 during the spindle speed control mode. A spindle speed detector 18 generates a spindle speed signal 20 representing a spin rate of the spindle motor 8, and a spindle speed fault detector 22 is responsive to the spindle speed signal 20 for detecting the spindle speed fault mode and generating a second control signal 24 in response to the detected spindle speed fault mode. The actuator driver circuit 16 is responsive to the second control signal 24 so that the actuator 10 retracts the head 6 away from the data area 4 independent of the servo microprocessor 12 during the spindle speed fault mode.

In the embodiment of FIG. 1, the head 6 is retracted to an area on the disk 2 referred to as a landing zone 26. The landing zone 26 is a concentric band located at a predetermined area on the disk 2 (e.g., an inner concentric band 26 as in FIG. 1) where no data is recorded. The surface of the landing zone 26 is typically highly polished so that the head 6 is not damaged when landing on the landing zone 26. In an alternative embodiment, the head 6 is retracted to a loading ramp as is well known in the art.

The disk drive 1 of FIG. 1 also comprises a spindle driver circuit 28 which receives control signals 30 from the servo microprocessor 12 for controlling the speed and direction of the spindle motor 8. In the embodiment of the present invention shown in FIG. 2, the actuator driver circuit 16 (VCM driver) and the spindle driver circuit 28 are integrated into a single chip referred to as a power driver 32. The spindle speed detector 18 and the spindle speed fault detector 22 are integrated into the spindle driver circuit 28 within the power driver 32.

Figure 2:
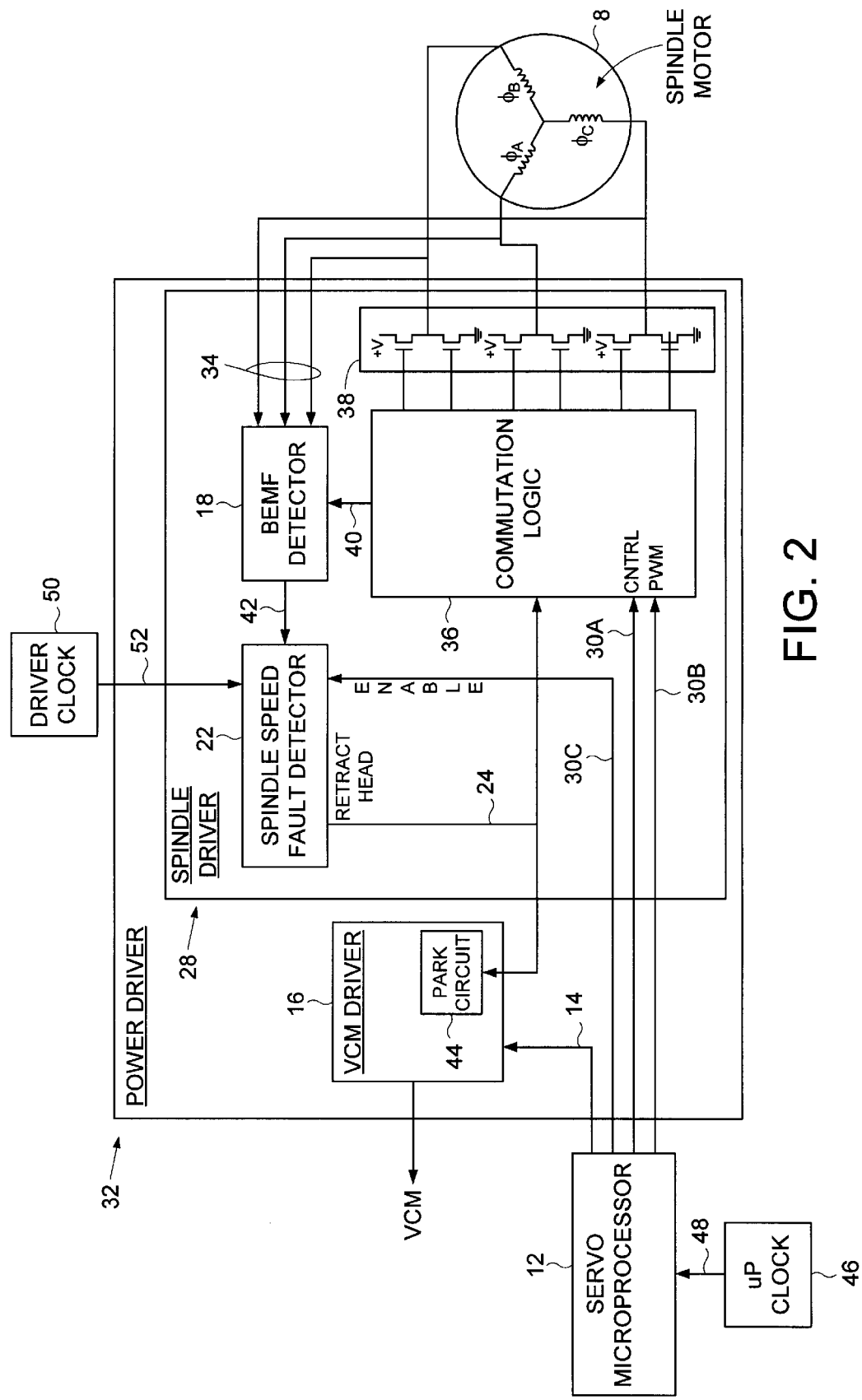
FIG. 2 shows a more specific embodiment of the present invention wherein the spindle speed fault detector measures the time between threshold crossings in a back EMF (BEMF) signal generated by the spindle motor.

The spindle motor 8 of FIG. 2 is implemented using a suitable 3-phase brushless DC motor comprising three motor windings $\phi_A$, $\phi_B$, $\phi_C$. A back EMF (BEMF) signal 34 is generated by the three motor windings $\phi_A$, $\phi_B$, $\phi_C$, and the spindle speed detector 18 is implemented as a conventional BEMF detector 18 which detects threshold crossings in the BEMF signal 34 (e.g., zero crossings). The spindle driver circuit 28 further comprises commutation logic 36 for generating commutation signals applied to power switches 38 according to a specific sequence generated by a state machine. The state machine sequence causes the spindle motor to rotate, as is well known in the art. The servo microprocessor 12 transfers via control signal 30A control information (such as a starting state and a commutation clock) to the commutation logic 36. The servo microprocessor 12 also provides a pulse-width modulated (PWM) signal 30B to the commutation logic 36 which controls the magnitude of the driving current and thus the torque generated by the spindle motor 8.

The commutation sequence is generated by the commutation logic 36 such that the power switches 38 apply the driving current to two of the three spindle motor windings during each state in the sequence. Thus, the BEMF signal 34 is only valid for one of the motor windings at a time. The commutation logic 36 provides a control signal 40 to the BEMF detector 18 identifying the motor winding that is not being driven. The BEMF detector 18 comprises suitable detection circuitry for detecting a threshold crossing (e.g., a zero crossing) in the selected BEMF signal 34 as is well known in the art. At each BEMF threshold crossing the BEMF detector 18 toggles a signal to generate a square wave signal 42. The frequency of the BEMF threshold crossings and thus the frequency of the square wave signal 42 represent the speed of the spindle motor 8. The spindle speed fault detector 22 processes the square wave signal 42 and detects a spindle speed fault mode when the frequency of the square wave signal 42 decreases below a predetermined threshold. In response to detecting the spindle speed fault mode, the spindle speed fault detector 22 generates a control signal 24 which causes the actuator driver circuit 16 (VCM driver) to retract the head 6 independent from the servo microprocessor 12. The control signal 24 is also applied to the commutation logic 36 which responds, for example, by generating a negative torque sequence in order to break the spindle motor 8. The control signal 24 may also be applied to the servo microprocessor 12 so that it can perform an appropriate recovery procedure (assuming the servo microprocessor 12 is still operating). In an embodiment described below with reference to FIG. 4, the control signal 24 is also applied to a read/write channel in order to disable the write current independent of the servo microprocessor 12 before retracting the head 6 from the data area 4 of the disk 2.

The actuator driver circuit 16 (VCM driver) comprises a park circuit 44 which automatically retracts the head 6 away from the data area 4 of the disk 2 in response to the control signal 24. The park circuit 44 comprises suitable circuitry for retracting the head 6 as is well known in the art. For example, there are known park circuits 44 which are powered by the BEMF signal 34 generated by the spindle motor 8 so that the park circuit 44 can retract the head 6 during a power failure.

The spindle speed fault detector 22 is enabled by a control signal 30C generated by the servo microprocessor 12. When the disk 2 is spinning up (e.g., when powered on or after an idle mode), the spindle speed fault detector 22 is initially disabled. Once the spindle motor 8 reaches a predetermined operating speed, the servo microprocessor 12 activates the spindle speed fault circuit 22 which detects a spindle speed fault mode if the spindle motor speed decreases below a predetermined threshold.

In the embodiment of FIG. 2, a microprocessor clock 46 generates a first clock signal 48 applied to the servo microprocessor 12 and a driver clock 50 generates a second clock signal 52 applied to the spindle speed fault detector 22. In this manner, if the microprocessor clock 46 fails, the spindle speed fault mode can still be detected. The driver clock 48 can be implemented using any suitable circuitry for generating an oscillating signal, such as a crystal or a resistor-capacitor (RC) network.

Figure 3A:
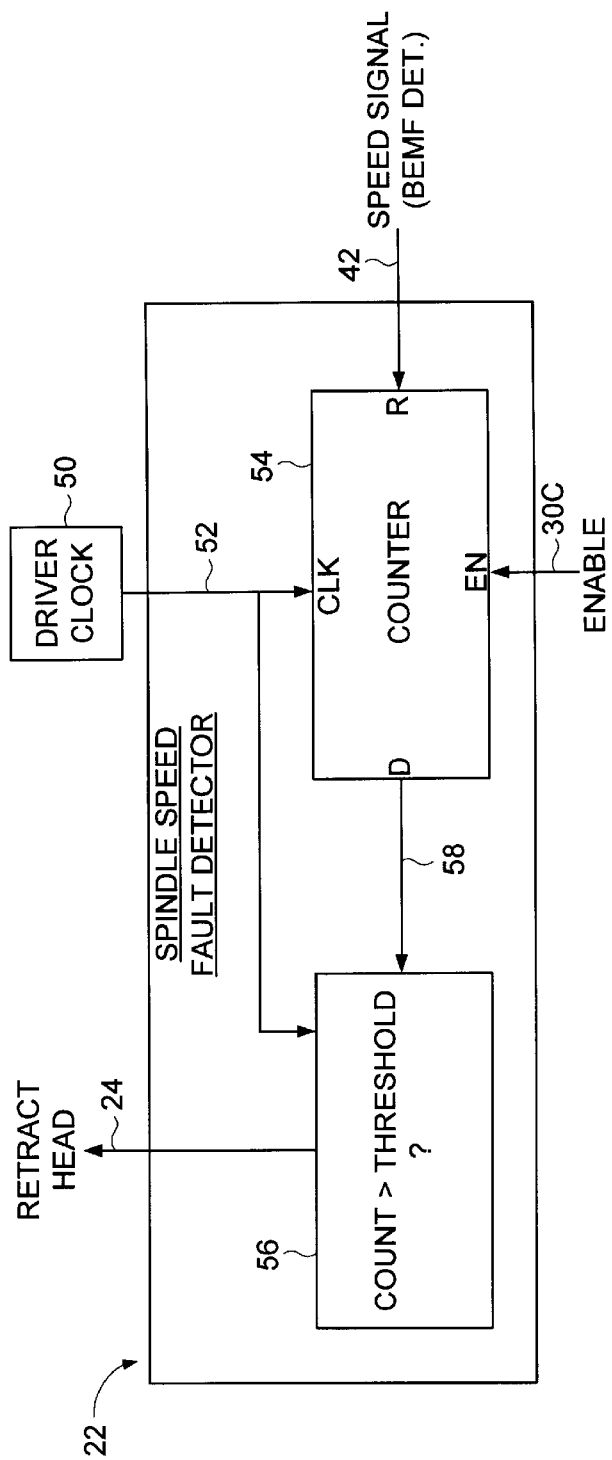
FIG. 3A shows details of the spindle speed fault detector of FIG. 2, wherein the number of clocks between BEMF crossings is counted by a counter, and the output of the counter is compared to a threshold to detect the spindle speed fault mode.
Figure 3B:
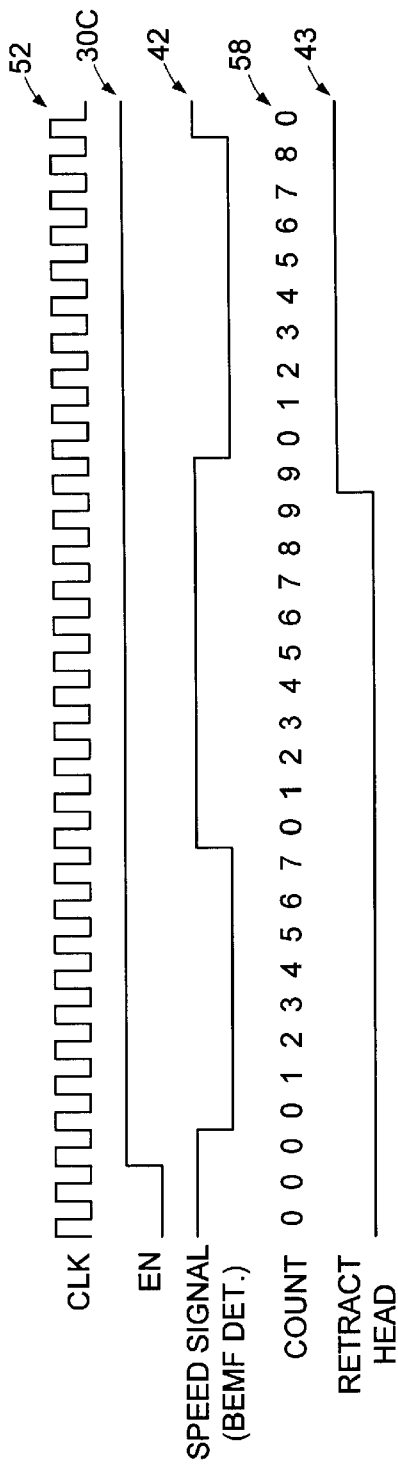
FIG. 3B is a timing diagram illustrating the operation of the spindle speed fault detector shown in FIG. 3A.

Details of a suitable spindle speed fault detector 22 are shown in FIG. 3A with a timing diagram illustrating its operation shown in FIG. 3B. The clock signal 52 generated by the driver clock 50 is applied to a counter 54 and a threshold detector 56. The counter 54 increments a count output signal 58 on every clock cycle of clock signal 52. The spindle speed signal 42 (BEMF threshold detect) is applied to a reset line of the counter 54 such that the counter 54 is reset at every transition in the spindle speed signal 42. If the count output signal 58 exceeds a predetermined threshold, then the spindle speed fault mode is detected and the threshold detector 56 activates control signal 24 in order to retract the head 6 independent from the servo microprocessor 12. This sequence is illustrated in the timing diagram of FIG. 3B.

Initially, the spindle speed fault detector 22 is disabled by control signal 30C which deactivates the counter 54 setting the count output signal 58 to zero. Once the spindle motor 8 reaches a predetermined operating speed, the counter 54 in the spindle speed fault detector 22 is activated by control signal 30C and it begins to increment the count output signal 58 on every cycle of clock signal 52. If the spindle speed signal 42 transitions before the count output signal 58 exceeds a predetermined threshold (e.g., 9), then the counter 54 is reset and begins counting again from zero. If a transition does not occur in the spindle speed signal 42 before the count output signal 58 reaches the predetermined value, then a spindle speed fault mode is detected and the threshold detector 56 activates control signal 24 in order to retract the head 6 independent from the servo microprocessor 12.

Figure 4:
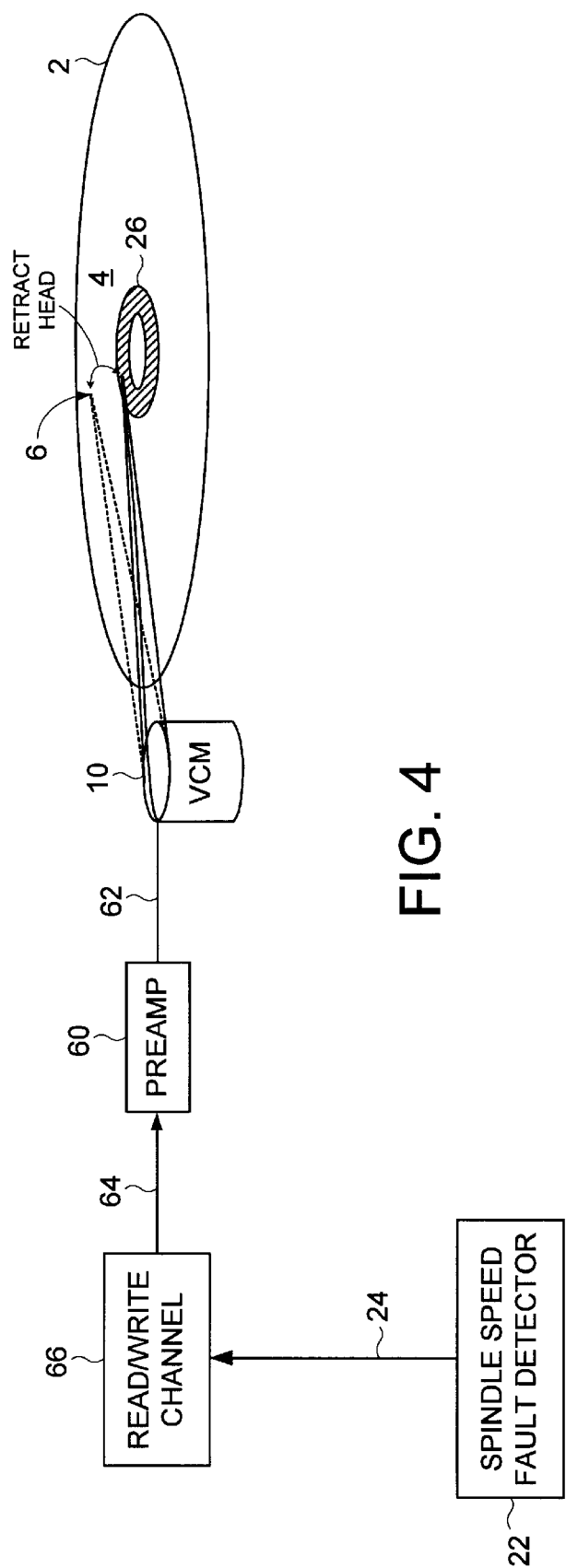
FIG. 4 illustrates how the write current is disabled independent of the servo microprocessor when a spindle speed fault mode is detected according to an embodiment of the present invention.

FIG. 4 shows an embodiment of the present invention wherein the write current applied to the head 6 is disabled by the control signal 24 independent from the servo microprocessor 12 before retracting the head 6. This prevents the head 6 from corrupting other data recorded on the disk 2 as it traverses radially toward the landing zone 26 (or loading ramp). A suitable preamp circuit 60 provides write current to the head 6 over line 62 in response to a control signal 64 generated by a read/write channel 66. During a normal write operation, the read/write channel 66 provides the preamp circuit 60 with the data to be written to the disk 2 and activates control signal 64 to enable the write current on line 62. When the spindle speed fault detector 22 detects a spindle speed fault mode, before retracting the head 6 control signal 24 is applied to the read/write channel 66 in order to disable control line 64 and thereby disable the write current on line 62 independent of the servo microprocessor 12.

Figure 5:
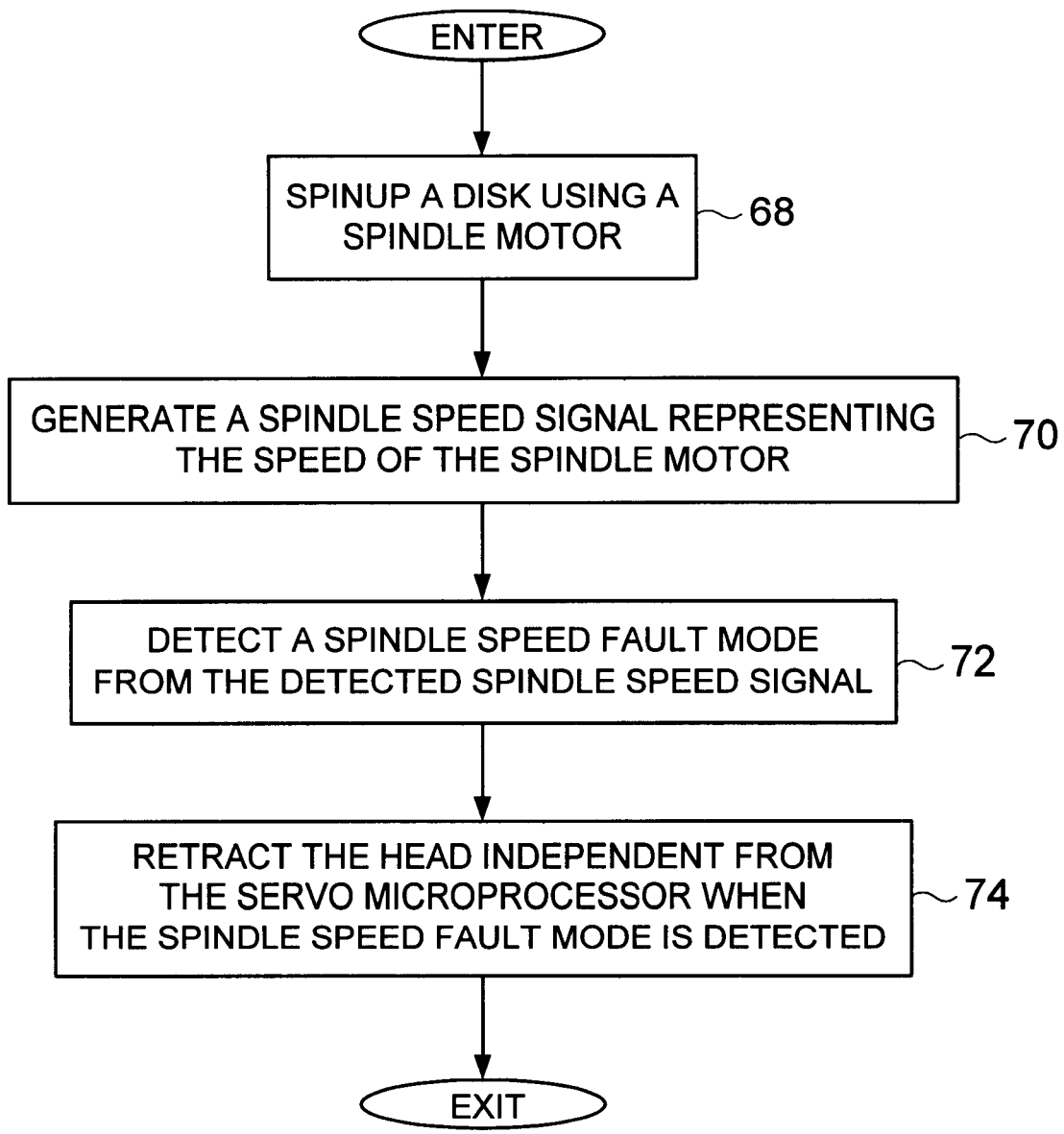
FIG. 5 is a flow diagram according to the embodiment of the present invention shown in FIG. 1.

FIG. 5 shows a flow diagram of the steps executed according to the embodiment of the present invention shown in FIG. 1. At step 68, the servo microprocessor 12 spins up the disk 2 by controlling the spindle motor 8. At step 70 a spindle speed signal 20 is generated representing the speed of the spindle motor 8. The spindle speed signal 20 is processed at step 72 to detect a spindle speed fault mode, and at step 74, the head 6 is retracted independent of the servo microprocessor 12 in response to the detected spindle speed fault mode.

Figure 6:
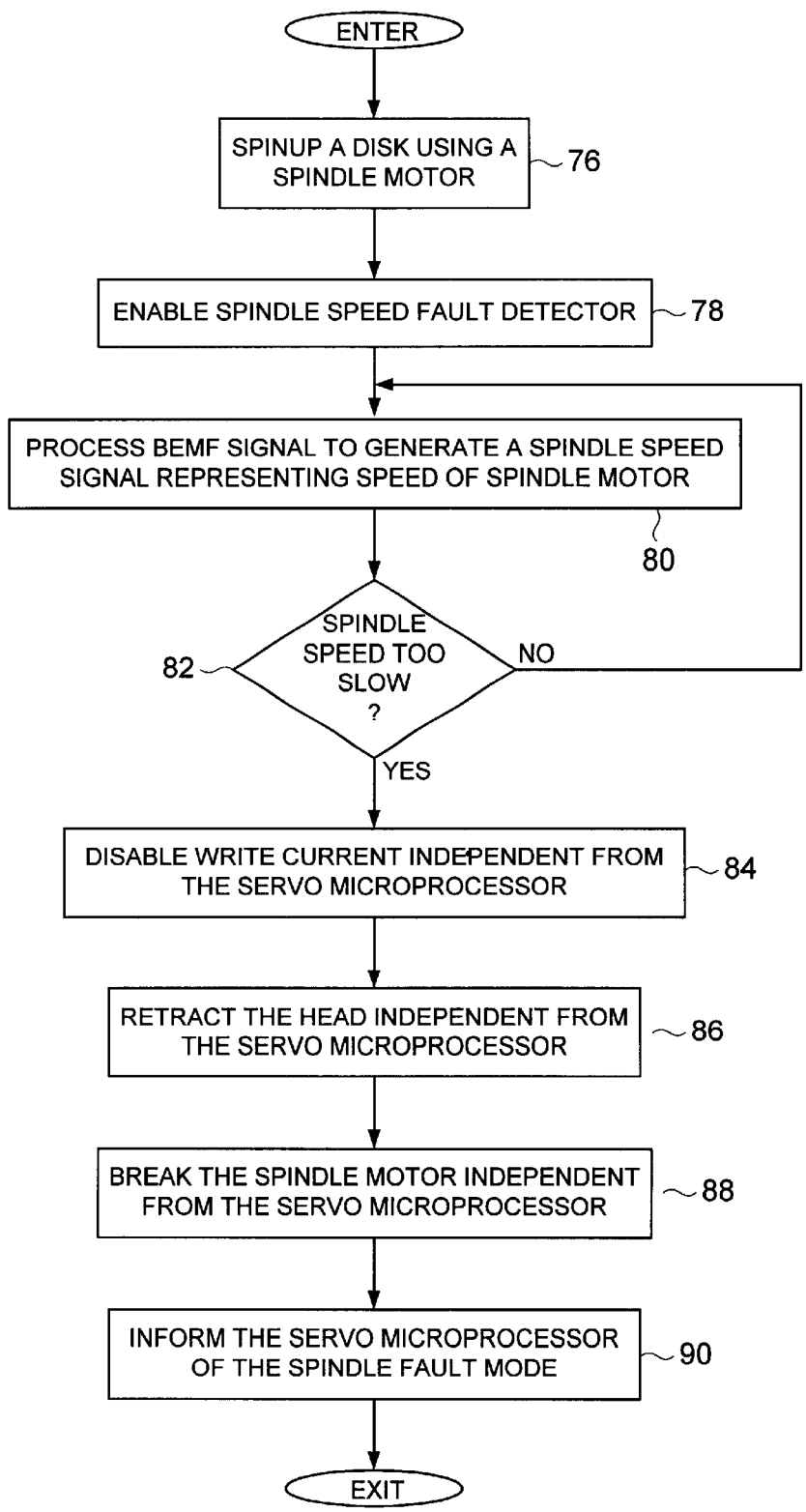
FIG. 6 is a flow diagram according to the embodiment of the present invention shown in FIG. 2.

FIG. 6 shows a flow diagram of the steps executed according to the embodiment of the present invention shown in FIG. 2. At step 76 the servo microprocessor 12 spins up the disk 2 by controlling the spindle motor 8. When the spindle motor 8 reaches a predetermined speed, the spindle speed fault detector 22 is enabled at step 78. At step 80 a spindle speed signal 42 representing the speed of the spindle motor is generated by detecting threshold crossings in the BEMF signal 34 generated by the spindle motor 8. If at step 82 the spindle speed is too slow, then at step 84 the write current applied to the head 6 is disabled independent of the servo microprocessor 12, at step 86 the head 6 is retracted from the data area 4 of the disk 2 independent from the servo microprocessor 12, and at step 88 the commutation logic 36 breaks the spindle motor 8 independent from the servo microprocessor 12. The spindle speed fault mode may also be communicated to the servo microprocessor 12 at step 90 so that it can perform an appropriate recovery procedure (assuming the servo microprocessor 12 is still operating).

I claim:

1. A disk drive comprising:
   a. a disk having a data area;
   b. a head;
   c. a spindle motor for spinning the disk;
   d. an actuator for positioning the head over the data area during a spindle speed control mode and retracting the head away from the data area during a spindle speed fault mode;
   e. a servo microprocessor for executing steps of a servo control program to generate a first control signal;
   f. an actuator driver circuit responsive to the first control signal for controlling the actuator during the spindle speed control mode;
   g. a spindle speed detector for generating a spindle speed signal representing a spin rate of the spindle motor; and
   h. a spindle speed fault detector responsive to the spindle speed signal for detecting the spindle speed fault mode, the spindle speed fault detector generates a second control signal in response to the detected spindle speed fault mode; and
   wherein the actuator driver circuit is responsive to the second control signal so that the actuator retracts the head away from the data area independent of the servo microprocessor during the spindle speed fault mode.

2. The disk drive as recited in claim 1, further comprising a spindle driver circuit comprising commutation logic for controlling the spindle motor, wherein the spindle driver circuit, spindle speed detector, and spindle speed fault detector are integrated into a single circuit.

3. The disk drive as recited in claim 1, wherein the spindle speed detector comprises a back EMF (BEMF) detector responsive to a BEMF signal generated by the spindle motor.

4. The disk drive as recited in claim 3, wherein:
   a. the back EMF (BEMF) detector generates a threshold crossing signal indicative of the BEMF signal crossing a predetermined threshold;
   b. the spindle speed fault detector measures a time between threshold crossings in the threshold crossing signal; and
   c. the spindle speed fault detector detects the spindle speed fault mode when the time between threshold crossings exceeds a predetermined threshold.

5. The disk drive as recited in claim 1, further comprising:
   a. a microprocessor clock for clocking operation of the servo microprocessor; and b. a driver clock for clocking operation of the spindle speed fault detector.

6. The disk drive as recited in claim 1, further comprising a preamplifier for providing a write current to the head for writing data to the disk, wherein the write current is disabled independent of the servo microprocessor before retracting the head from the data area of the disk during the spindle speed fault mode.

7. A method of detecting a spindle speed fault mode in a disk drive and, in response to detecting the spindle speed fault mode, retracting a head away from a data area of a disk independent of a servo microprocessor for controlling a spindle motor within the disk drive, the spindle motor for spinning the disk, the method comprising the steps of:
   a. generating a spindle speed signal representing a spin rate of the spindle motor;
   b. processing the spindle speed signal to detect a spindle speed fault mode; and
   c. in response to the detected spindle speed fault mode, retracting the head away from the data area independent of the servo microprocessor.

8. The method of detecting a spindle speed fault as recited in claim 7, wherein the step of generating a spindle speed signal comprises the step of processing a BEMF signal generated by the spindle motor.

9. The method of detecting a spindle speed fault as recited in claim 8, wherein the step of generating a spindle speed signal further comprises the steps of:
   a. generating a threshold crossing signal indicative of the BEMF signal crossing a predetermined threshold;
   b. measuring a time between threshold crossings in the threshold crossing signal; and
   c. detecting the spindle speed fault when the time between threshold crossings exceeds a predetermined threshold.

10. The method of detecting a spindle speed fault as recited in claim 7, further comprising the steps of:
   a. clocking operation of the servo microprocessor using a microprocessor clock; and
   b. clocking the step of detecting the spindle speed fault using a driver clock.

11. The method of detecting a spindle speed fault as recited in claim 7, further comprising the step of disabling a write current applied to the head independent of the servo microprocessor before retracting the head from the data area of the disk in response to detecting the spindle speed fault mode.

* * * * *